United States Patent
Zhou et al.

(10) Patent No.: US 7,869,847 B2
(45) Date of Patent: Jan. 11, 2011

(54) SLIDING COVER ASSEMBLY AND PORTABLE ELECTRONIC DEVICE USING THE SAME

(75) Inventors: Xin-Quan Zhou, Shenzhen (CN); Hsiao-Hua Tu, Taipei Hsien (TW); Ye Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 32 days.

(21) Appl. No.: 12/403,515

(22) Filed: Mar. 13, 2009

(65) Prior Publication Data

US 2009/0267464 A1    Oct. 29, 2009

(30) Foreign Application Priority Data

Apr. 25, 2008  (CN) .................... 2008 1 0301306

(51) Int. Cl.
*H04M 1/00* (2006.01)
*G06F 1/16* (2006.01)
(52) U.S. Cl. ............................... 455/575.4; 361/679.56
(58) Field of Classification Search .............. 455/575.4; 361/679.56
See application file for complete search history.

(56) References Cited

U.S. PATENT DOCUMENTS

| | | | |
|---|---|---|---|
| 7,376,450 B2 * | 5/2008 | Chen ........................ | 455/575.4 |
| 7,636,591 B2 * | 12/2009 | Kim et al. ................ | 455/575.4 |
| 7,715,191 B2 * | 5/2010 | Leung .................... | 361/679.56 |
| 2005/0255897 A1 * | 11/2005 | Lee et al. ................. | 455/575.4 |
| 2006/0146014 A1 * | 7/2006 | Lehtonen ................... | 345/156 |
| 2008/0051161 A1 * | 2/2008 | Tashiro .................... | 455/575.1 |
| 2008/0076493 A1 * | 3/2008 | Seo et al. ................. | 455/575.4 |
| 2008/0081678 A1 * | 4/2008 | Ko .......................... | 455/575.4 |
| 2008/0186663 A1 * | 8/2008 | Chen ......................... | 361/681 |
| 2008/0207272 A1 * | 8/2008 | Thornton et al. ........... | 455/566 |
| 2008/0242380 A1 * | 10/2008 | Kajihara et al. .......... | 455/575.4 |

* cited by examiner

*Primary Examiner*—Lisa Lea-Edmonds
(74) *Attorney, Agent, or Firm*—Steven M. Reiss

(57) ABSTRACT

The application discloses a sliding cover assembly which includes a fixing piece and a sliding piece. The fixing piece defines at least one combination sliding slot there through. The combination sliding slot includes at least two sliding slots that form an angle and communicate with each other. The sliding piece includes at least one sliding block protruding thereon. The sliding block is slidably assembled with the combination sliding slot to make the sliding piece slide relative to the combination sliding slot in two directions. The invention also discloses a portable electronic device using the sliding cover assembly.

15 Claims, 9 Drawing Sheets

SLIDING COVER ASSEMBLY AND PORTABLE ELECTRONIC DEVICE USING THE SAME

BACKGROUND

1. Technical Field

The disclosure generally relates to a sliding cover assembly and portable electronic devices, such as mobile phones, personal digital assistants (PDAs), etc., using the sliding cover assembly.

2. Discussion of the Related Art

A large proportion of typical portable electronic devices as such as mobile phones and personal digital assistants (PDAs) use sliding cover assemblies.

A typical sliding cover assembly of a portable electronic device can only slide in one of two directions to cover or reveal an operational area of the device. This limits consumers in their method of operating the device and provides few choices for how to hold and operate the device.

Therefore, there is room for improvement within the art.

BRIEF DESCRIPTION OF THE DRAWING

Many aspects of the exemplary sliding cover assembly and portable electronic device using the sliding cover assembly can be better understood with reference to the following drawings. The components in the drawings are not necessarily drawn to scale, the emphasis instead being placed upon clearly illustrating the principles of the present sliding cover assembly and portable electronic device using the sliding cover assembly. Moreover, in the drawings, like reference numerals designate corresponding parts throughout the several views.

DETAILED DESCRIPTION OF THE EMBODIMENT

The present invention discloses a sliding cover assembly which is suitable for a portable electronic device, such as mobile phone, personal digital assistant (PDA), and the like.

The present invention also discloses a portable electronic device using the sliding cover assembly.

Figure 1:
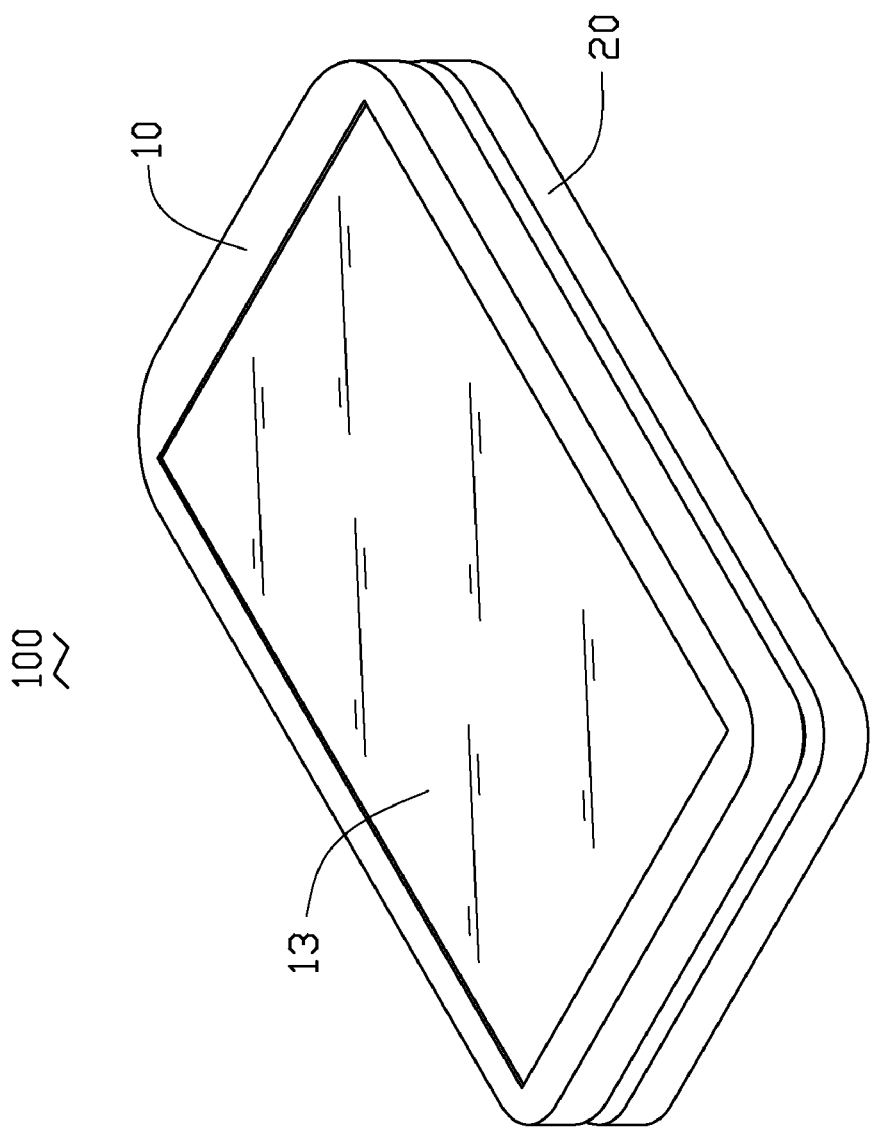
FIG. 1 shows a schematic, perspective view of a portable electronic device using the sliding cover assembly in closed operating mode, according to an exemplary embodiment.
Figure 2:
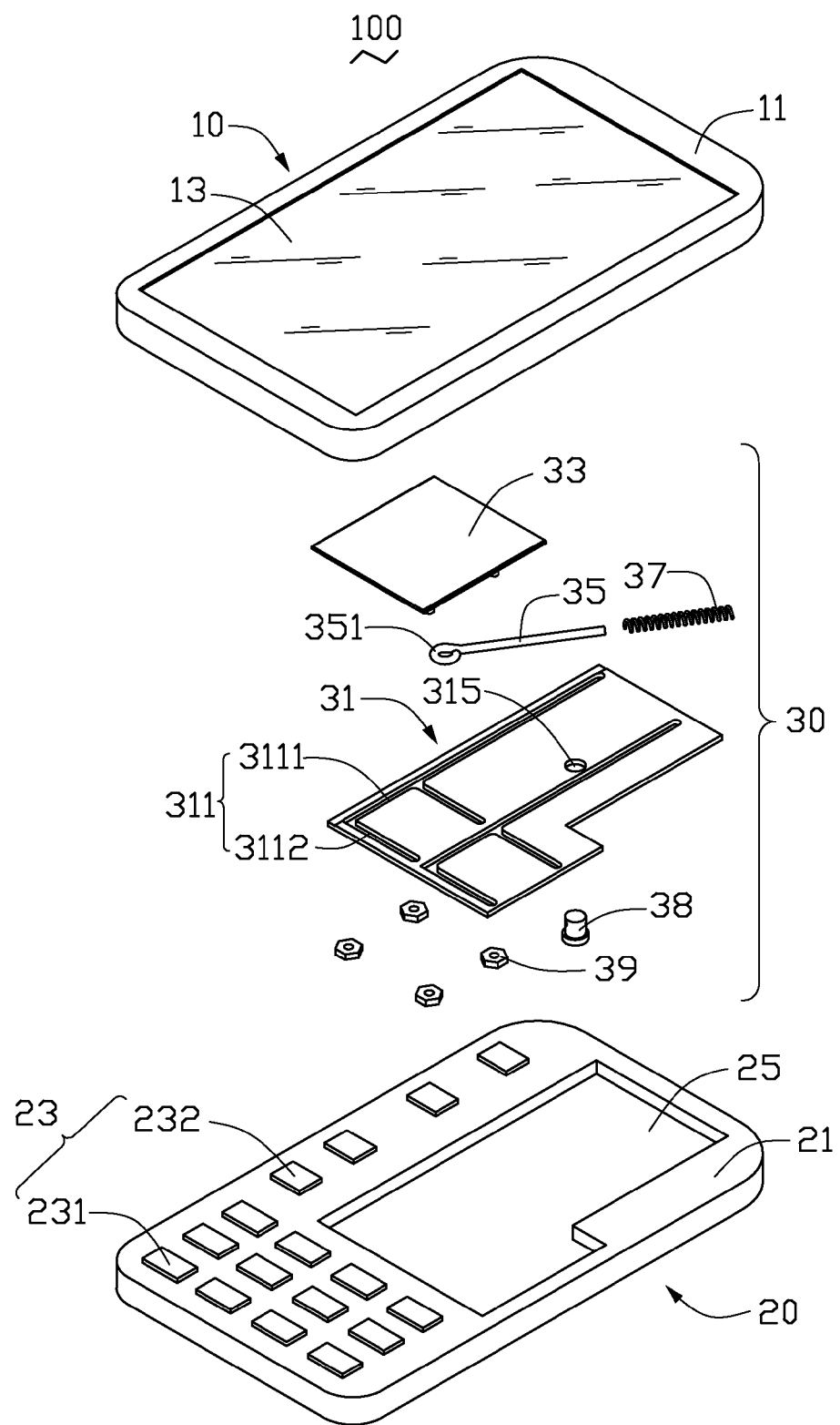
FIG. 2 shows a disassembled schematic, perspective view of the portable electronic device and the sliding cover assembly of FIG. 1.
Figure 3:
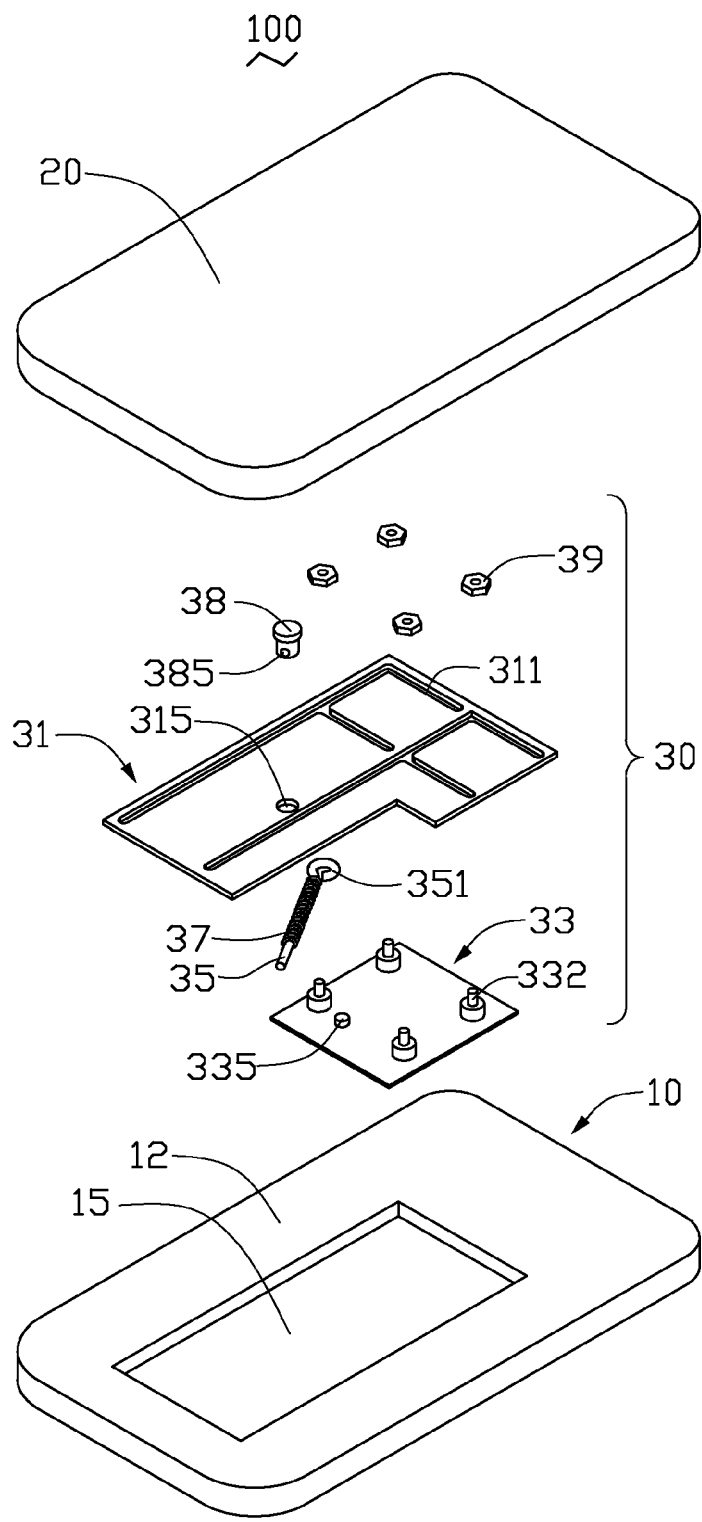
FIG. 3 is similar to FIG. 2, but viewed from another aspect.

Referring now to FIGS. 1~3, a portable electronic device 100 according to an exemplary embodiment includes a first body 10, a second body 20, and a sliding cover assembly 30 slidably connected to the first body 10 and the second body 20. The first body 10 can slide relative to the second body 20 in a first direction and a second direction perpendicular to the first direction to open the portable electronic device 100. The first body 10 is a substantially rectangular board, and includes an upper surface 11 and an opposite lower surface 12. The first body 10 has a touch display screen 13 disposed on the upper surface 11 for showing information and operating the portable electronic device 100. The first body 10 includes a substantially rectangular first recessed portion 15 in the lower surface 12 configured for receiving a portion of the sliding cover assembly 30.

The second body 20 is a substantially rectangular-shaped board. The second body 20 includes a matching surface 21 configured for mating with the lower surface 12 of the first body 10. The second body 20 has a keyboard area 23 disposed on the matching surface 21 and a generally L-shaped second recessed portion 25 in the matching surface 21 adjacent to the keyboard area 23. The keyboard area 23 is substantially L-shaped and includes a first key array 231 and a second key array 232. The first key array 231 is arranged parallel to the transverse direction of the second body 20, and the second key array 232 is arranged parallel to the longitudinal direction of the second body 20 perpendicular to the first key array 231.

The sliding cover assembly 30 includes a fixing piece 31, a sliding piece 33, a guiding rod 35, a coil spring 37, a guiding block 38, and at least one fixing block 39. The fixing piece 31 is a substantially L-shaped metal sheet and configured for being received within the second recessed portion 25 of the second body 20. The fixing piece 31 includes at least one combination sliding slot 311 and an assembling hole 315 defined therethrough. In the present embodiment, the fixing piece 31 includes two combination sliding slots 311 defined therethrough parallel to each other. The combination sliding slot 311 is substantially F-shaped and includes a first sliding slot 3111 longitudinally defined through the fixing piece 31 and two second sliding slots 3112 transversely defined through the fixing piece 31 communicating with the first sliding slot 3111. The first sliding slot 3111 and the two second sliding slots 3112 together cooperatively form the F-shaped combination sliding slot 311. The assembling hole 315 is defined through the middle portion of the fixing piece 31.

The sliding piece 33 is substantially rectangular board-shaped and received within the first recessed portion 15 of the first body 10. The sliding piece 33 includes at least one sliding block 332 and a fixing portion 335 disposed thereon for slidably assembling with the fixing piece 31. In the present embodiment, there are four sliding blocks 332. The four sliding blocks 332 are stepped and protrude from near the four corners of the sliding piece 33 for being slidably assembled with the combination sliding slot 311 of the fixing piece 31. The fixing portion 335 is substantially column-shaped. The fixing portion 335 protrudes from the sliding piece 33, and is disposed on the same side of the sliding block piece 33 as the sliding blocks 332.

The guiding rod 35 includes a looped-end 351. The looped-end 351 of the guiding rod 35 is rotatably assembled around the fixing portion 335 of the sliding piece 33. The coil spring 37 is coiled around the guiding rod 35. The guiding block 38 is substantially stepped and includes a guiding through hole 385 defined near an end thereof. The diameter of the guiding through hole 385 is substantially the same as the diameter of the guiding block 38 so the guiding block 38 can penetrate through the hole 385. In the present embodiment, the fixing block 39 is a locknut and there are four fixing blocks 39 fixed on the end of the four sliding blocks 332 respectively.

In assembly, the guiding block 38 rotatably penetrates through the assembling hole 315 of the fixing piece 31 and is exposed from the other side of the fixing piece 31. The guiding rod 35 penetrates through the coil spring 37 and the guiding through hole 385 of the guiding block 38. The sliding piece 33 is slidably assembled with the fixing piece 31, the four sliding blocks 332 of the sliding piece 33 are inserted into the two combination sliding slots 311 and exposed from the other side thereof. The looped-end 351 of the guiding rod 35 coiled around the fixing portion 335 of the sliding piece 33. The four fixing blocks 39 are fixed to the end of the four sliding blocks 332 respectively to prevent the sliding piece 33 from disengaging from the fixing piece 31. The fixing piece 31 and the sliding piece 33 of the sliding cover assembly 30 are firmly assembled with the second recessed portion 25 of the second body 20 and the first recessed portion 15 of the first body 10 respectively.

Figure 4:
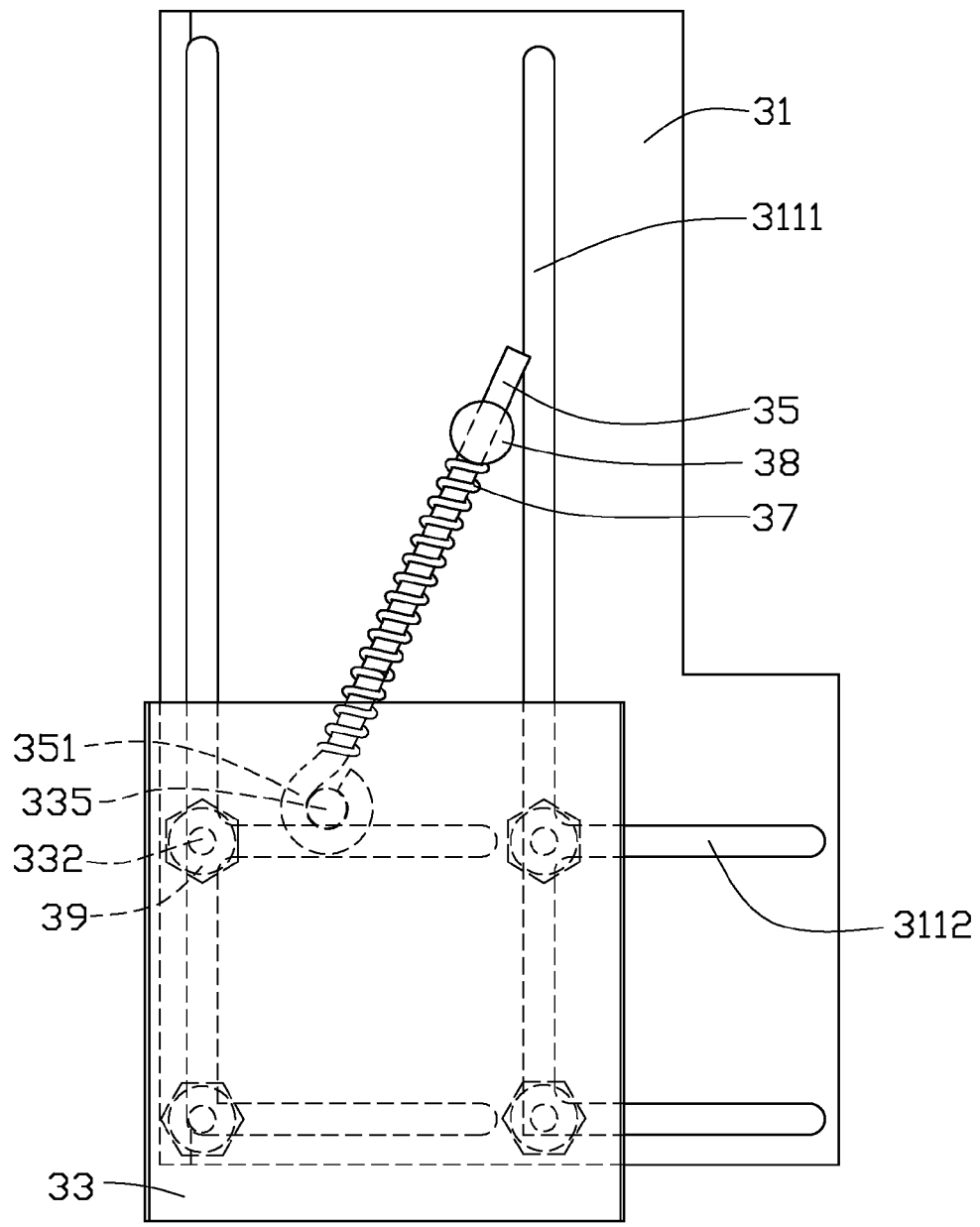
FIG. 4 shows a schematic, perspective, assembled view of the sliding cover assembly, in the closed operating mode of FIG. 1.

With this construction, the portable electronic device 100 has three operating modes including a closed operating mode, a first opened operating mode, and a second opened operating mode for consumer to choose for operating. Referring now to FIG. 1 and FIG. 4, the closed operating mode of the portable electronic device 100 is shown. The first body 10 covers the second body 20 hiding the keyboard area 23 of the second body 20. Users can operate the portable electronic device 100 by touching the touch display screen 13 of the first body 10. The sliding piece 33 of the sliding cover assembly 30 is located at the joint of the first sliding slot 3111 and the second sliding slot 3112.

Figure 5:
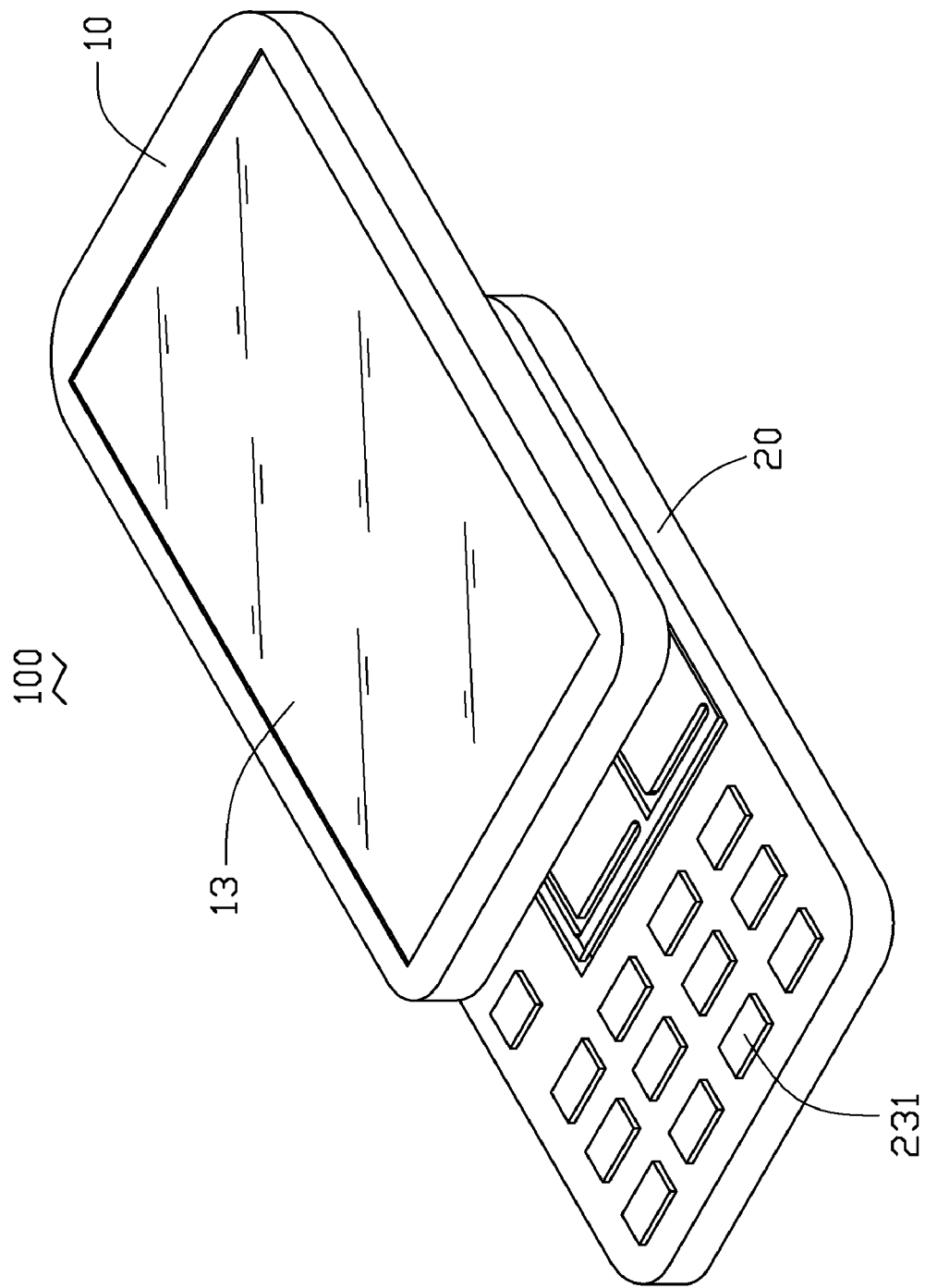
FIG. 5 shows a schematic, perspective view of a first opened operating mode of the portable electronic device using the sliding cover assembly, according to the exemplary embodiment.
Figure 6:
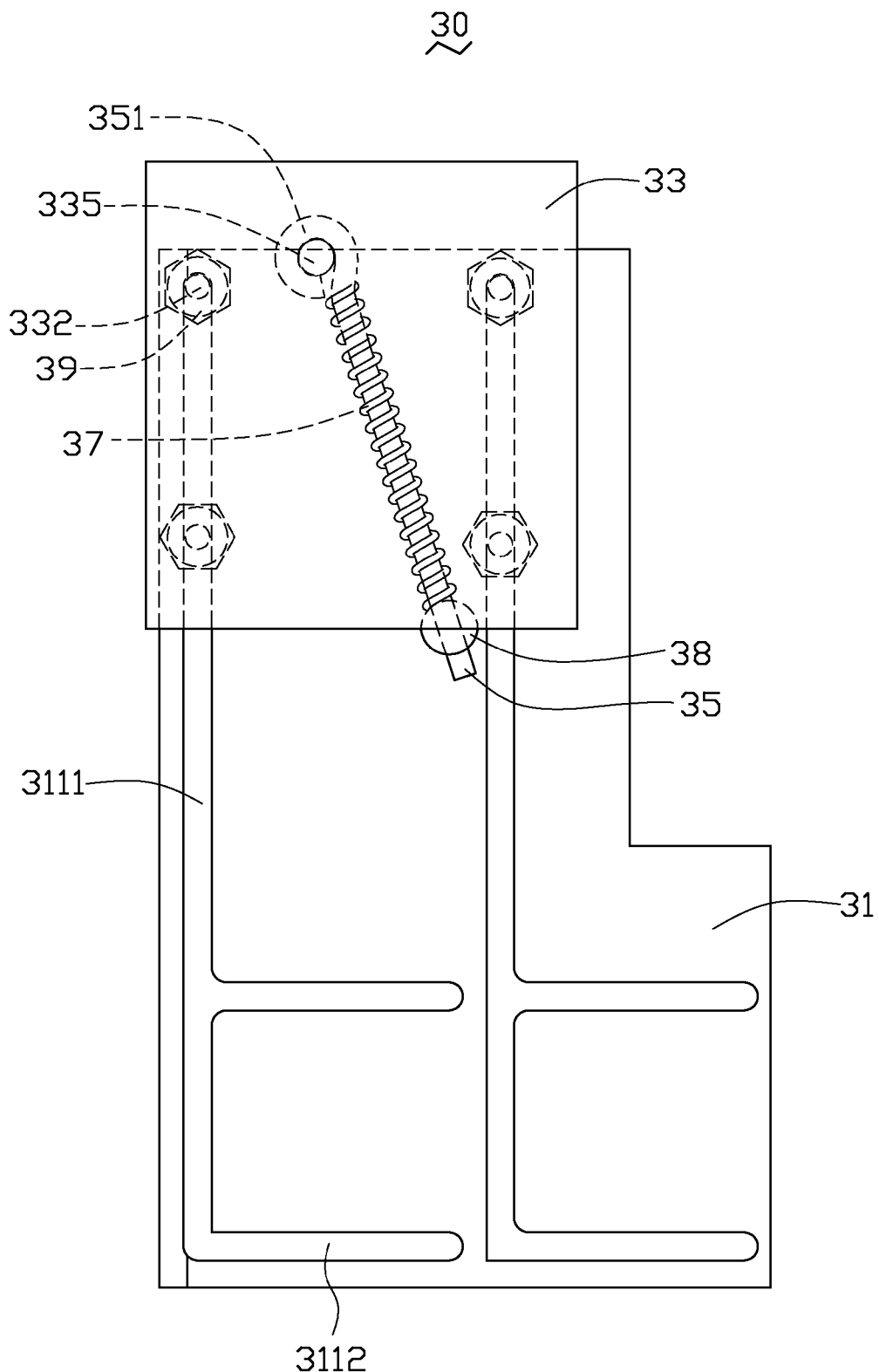
FIG. 6 is similar to FIG. 4 but showing the sliding cover assembly in the first opened operating mode.

Referring now to FIG. 5 and FIG. 6, which show the first opened operating mode of the portable electronic device 100. The first body 10 slides relative to the second body 20 in the longitudinal direction, thereby exposing the first key array 231 of the second body 20. During the sliding operation, the sliding piece 33 slides relative to the fixing piece 31 towards the first sliding slot 3111; the guiding rod 35 slides and rotates relative to the guiding block 38, the coil spring 37 being compressed at first and being released after the guiding rod 35 goes beyond perpendicular to the first sliding slot 3111. When the coil spring 37 releases, it pushes the sliding piece 33 slide relative to the fixing piece 31 along the first sliding slot 3111 till the end thereof to open the first body 10 automatically. The consumer could operate the portable electronic device 100 by press the first key array 231 of the second body 20. The sliding piece 33 is located at the end of the first sliding slot 3111.

Figure 7:
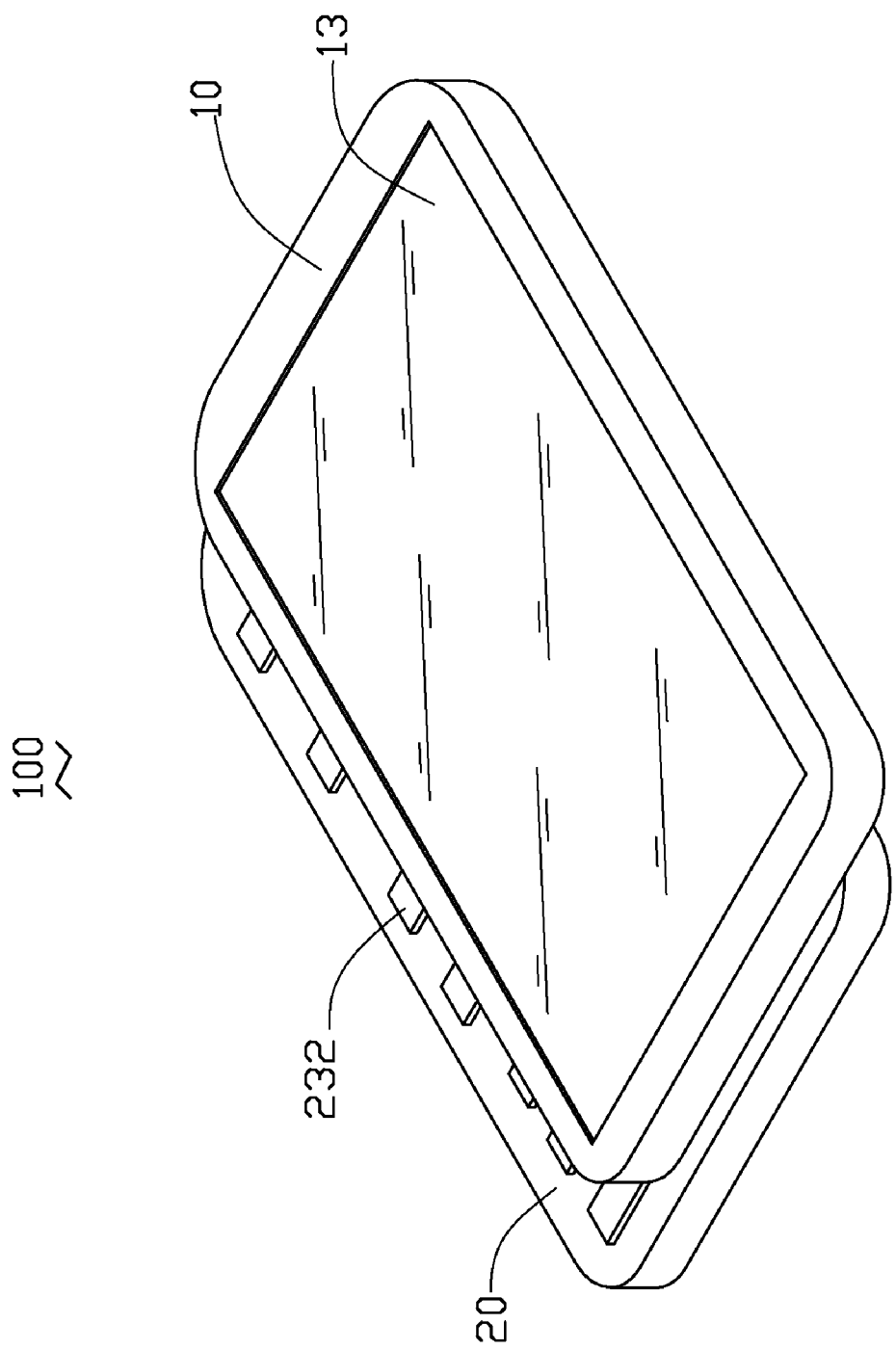
FIG. 7 shows a schematic, perspective view of the second opened operating mode of the portable electronic device using the sliding cover assembly, according to the exemplary embodiment.
Figure 8:
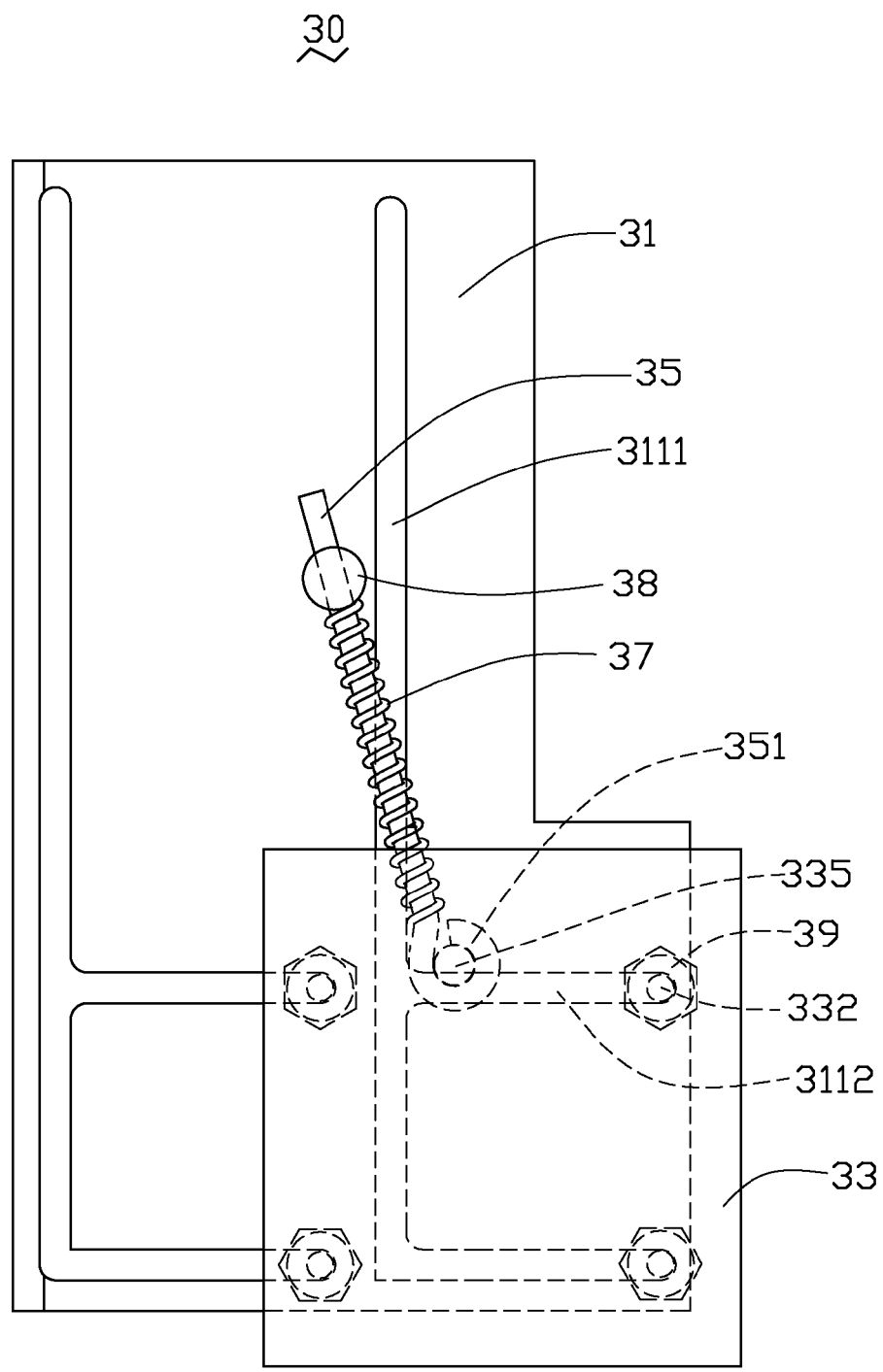
FIG. 8 is similar to FIG. 6 but showing the sliding cover assembly in the second opened operating mode.

Referring now to FIG. 7 and FIG. 8, which show the second opened operating mode of the portable electronic device 100. The first body 10 slides relative to the second body 20 in the transverse direction, thereby exposing the second key array 232 of the second body 20. During the sliding operation, the sliding piece 33 slides relative to the fixing piece 31 towards the second sliding slot 3112; the guiding rod 35 slides and rotates relative to the guiding block 38, the coil spring 37 being compressed at first and being released after the guiding rod 35 goes beyond perpendicular to the second sliding slot 3112. When the coil spring 37 releases, it pushes the sliding piece 33 relative to the fixing piece 31 along the second sliding slot 3112 to the end thereof to open the first body 10 automatically. The consumer could operate the portable electronic device 100 by pressing the second key array 232 of the second body 20. The sliding piece 33 of the sliding cover assembly 30 is located at the end of the second sliding slot 3112.

The portable electronic device 100 has three operating modes including a closed operating mode, a first opened operating mode and a second opened operating mode that provide consumers with choices of how to hold and operate the phone.

It is to be understood that the shape of the combination sliding slot 311 is not just limited to the F-shaped slot, it also can be an L-shaped or V-shaped slot to make the sliding piece 33 slide relative to the fixing piece 31 towards two different directions. The number of the combination sliding slot 311 is not just limited to the two, the number also can be increased or decreased by the needs.

Figure 9:
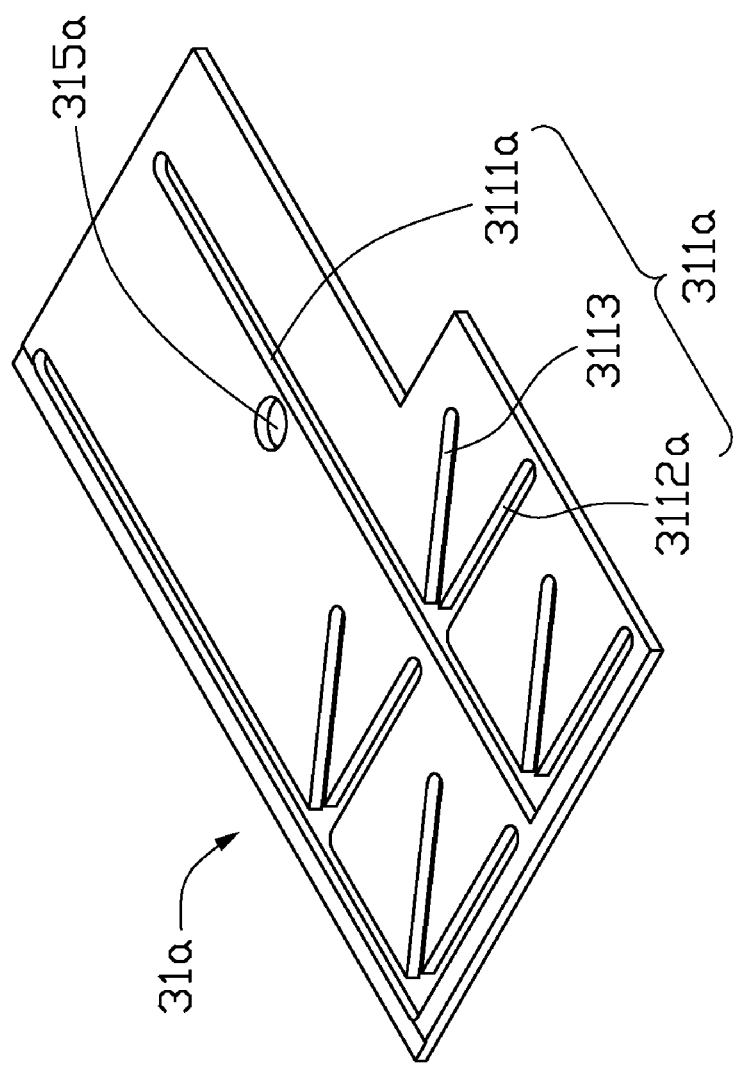
FIG. 9 shows a schematic, perspective view of an alternative fixing piece of the sliding cover assembly, according to the exemplary embodiment.

FIG. 9 shows a schematic, perspective view of an alternative fixing piece 31a of the sliding cover assembly 30. The fixing piece 31a is a substantially L-shaped metal sheet. The fixing piece 31a includes two parallel combination sliding slots 311a and an assembling hole 315a. Each combination sliding slot 311a includes a first sliding slot 3111a, two second sliding slots 3112a and two third sliding slots 3113. The first sliding slot 3111a is longitudinally defined through the fixing piece 31a. The two second sliding slots 3112a are parallel to each other and transversely defined through the fixing piece 31. The two third sliding slots 3113 are parallel to each other and defined through the fixing piece 31. The first, second, and third sliding slots have portions that communicate with each other. The two third sliding slots 3113 are located between the first sliding slot 3111a and the corresponding second sliding slot 3112a to form acute angles with the first sliding slot 3111a and the second sliding slot 3112a respectively. The assembling hole 315a is defined through the middle portion of the fixing piece 31a. With this construction, the portable electronic device 100, while operating similar to as previously described, can satisfy the multi-operating modes of consumers including a closed operating mode, a first opened operating mode, a second opened operating mode and a third opened operating mode for consumer to choose from.

Finally, it is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A sliding cover assembly for a portable electronic device, comprising:
    a fixing piece having at least one combined slot defined there through, the combined slot having at least two sliding slots communicating with each other at an angle; and
    a sliding piece comprising at least one sliding block protruding therefrom to slidably assemble with the combined slot of the fixing piece for sliding relative to the fixing piece along at least two directions;
    wherein, the combined slot includes a first sliding slot longitudinally defined through the fixing piece and a second sliding slot transversely defined through the fixing piece communicating with the first sliding slot; the fixing piece further comprises an assembling hole defined therethrough, the sliding cover assembly further comprises a guiding block, the guiding block rotatablely penetrates through the assembling hole and is exposed from the other side.

2. The sliding cover assembly as claimed in claim 1, wherein the sliding piece further comprises a fixing portion protruding therefrom; the sliding cover assembly further comprises a guiding rod, the guiding rod includes a loop end rotatablely assembled around the fixing portion of the sliding piece.

3. The sliding cover assembly as claimed in claim 2, wherein the guiding block includes a guiding through hole defined at the end thereof, the guiding rod slidably penetrates through the guiding through hole of the guiding block.

4. The sliding cover assembly as claimed in claim 2, wherein the sliding cover assembly further comprising a coil spring coiled around the guiding rod.

5. The sliding cover assembly as claimed in claim 1, wherein the sliding piece includes at least one sliding block protruding from the four corners thereof for being slidably assembled in the combination sliding slot of the fixing piece, the sliding cover assembly further comprises at least one fixing block for firmly fixing to the sliding block when the sliding block is assembled in the combination sliding slot of the fixing piece.

6. The sliding cover assembly as claimed in claim 5, wherein the combined slot is F-shaped; the combined slot includes a first sliding slot longitudinally defined through the fixing piece and two second sliding slots transversely defined there through and communicating with the first sliding slot.

7. A portable electronic device comprising:
   a first body;
   a second body; and
   a sliding cover assembly being slidably connected with the first body and the second body comprising:
      a fixing piece having at least one combined slot defined there through, the combined slot having at least two sliding slots communicating with each other at an angle; and
      a sliding piece comprising at least one sliding block protruding therefrom to slidably assemble with the combined slot of the fixing piece for sliding relative to the fixing piece along at least two directions;
   wherein, the combined slot includes a first sliding slot longitudinally defined through the fixing piece and a second sliding slot transversely defined through the fixing piece communicating with the first sliding slot; the fixing piece further comprises an assembling hole defined therethrough, the sliding cover assembly further comprises a guiding block, the guiding block rotatablely penetrates through the assembling hole and is exposed from the other side.

8. The portable electronic device as claimed in claim 7, wherein the sliding piece further comprises a fixing portion protruding therefrom; the sliding cover assembly further comprises a guiding rod, the guiding rod includes a loop end disposed at an end thereof, the loop end is rotatablely assembled around the fixing portion of the sliding piece.

9. The portable electronic device as claimed in claim 8, wherein the guiding block includes a guiding through hole defined at the end thereof, the guiding rod slidably penetrates through the guiding through hole of the guiding block.

10. The portable electronic device as claimed in claim 9 wherein the sliding cover assembly further includes a coil spring coiled around the guiding rod.

11. The sliding cover assembly as claimed in claim 7, wherein the first body includes an upper surface and a lower surface opposite to the upper surface, the upper surface has a touch display screen disposed thereon; the lower surface includes a rectangular groove-shaped first recessed portion recessed therefrom, configured for assembling with the sliding piece of the sliding cover assembly.

12. The sliding cover assembly as claimed in claim 11, wherein the second body includes a matching surface configured for mating with the lower surface of the first body; the matching surface disposes a keyboard area and a second recessed portion configured for assembling with the fixing piece of the sliding cover assembly.

13. The sliding cover assembly as claimed in claim 12, wherein the keyboard area is L-shaped arranged on the matching surface of the second body including a first key array and a second key array; the first key array is arranged parallel to the transverse direction of the second body, the second key array is arranged parallel to the longitudinal direction of the second body and perpendicular to the first key array.

14. The sliding cover assembly as claimed in claim 9, wherein the sliding piece includes at least one sliding block protruding from the four corners thereof for being slidably assembled in the combination sliding slot of the fixing piece, the sliding cover assembly further comprises at least one fixing block for firmly fixing to the sliding block when the sliding block is assembled in the combination sliding slot of the fixing piece.

15. The portable electronic device as claimed in claim 14, wherein the combined slot is F-shaped; the combined slot includes a first sliding slot longitudinally defined through the fixing piece and two second sliding slots transversely defined there through and communicating with the first sliding slot.

* * * * *